US012686142B2

(12) United States Patent
Kim

(10) Patent No.: US 12,686,142 B2
(45) Date of Patent: Jul. 21, 2026

(54) ELECTRODE CUTTING DEVICE AND ELECTRODE MANUFACTURING APPARATUS INCLUDING THE SAME

(71) Applicant: LG Energy Solution, Ltd., Seoul (KR)

(72) Inventor: Nam Young Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 795 days.

(21) Appl. No.: 17/917,417

(22) PCT Filed: Jan. 27, 2022

(86) PCT No.: PCT/KR2022/001422
§ 371 (c)(1),
(2) Date: Oct. 6, 2022

(87) PCT Pub. No.: WO2022/164209
PCT Pub. Date: Aug. 4, 2022

(65) Prior Publication Data
US 2023/0158697 A1 May 25, 2023

(30) Foreign Application Priority Data
Jan. 29, 2021 (KR) ........................ 10-2021-0013007

(51) Int. Cl.
*B26D 5/24* (2006.01)
*B26D 1/06* (2006.01)
(Continued)

(52) U.S. Cl.
CPC ................ *B26D 5/24* (2013.01); *B26D 1/06* (2013.01); *B26D 5/04* (2013.01); *B26D 7/025* (2013.01);
(Continued)

(58) Field of Classification Search
CPC .......... B26D 1/015; B26D 1/085; B26D 5/04; B26D 5/12; B26D 7/015; B26D 7/02; B26D 7/025; H01M 10/04; H01M 10/0404
See application file for complete search history.

(56) References Cited

U.S. PATENT DOCUMENTS

| | | | |
|---|---|---|---|
| 5,497,685 | A | 3/1996 | Mohr |
| 2013/0244083 | A1 | 9/2013 | Min |

(Continued)

FOREIGN PATENT DOCUMENTS

| | | |
|---|---|---|
| CN | 204558561 U | 8/2015 |
| CN | 205646016 U | 10/2016 |

(Continued)

OTHER PUBLICATIONS

Search Report dated Apr. 7, 2025 from the Office Action for Chinese Application No. 202280003512.6 Issued Apr. 9, 2025, pp. 1-2.

(Continued)

*Primary Examiner* — Livius R. Cazan
(74) *Attorney, Agent, or Firm* — Lerner David LLP

(57) ABSTRACT

The present invention relates to an electrode cutting device including a cutting unit configured to cut an electrode sheet and a fixing unit configured to fix the electrode sheet, wherein the cutting unit includes a cutter configured to cut the electrode sheet by shearing and a cutter lifting portion configured to move the cutter so as to be perpendicular to a surface of the electrode sheet, and the fixing unit includes a gripper configured to press the electrode sheet so as to be fixed, a driving portion configured to drive the gripper so as to be moved, and a sensor configured to monitor the driving portion, whereby it is possible to rapidly and accurately check whether air leaks from the driving portion, which drives the gripper.

10 Claims, 3 Drawing Sheets

(51) Int. Cl.

| | | |
|---|---|---|
| *B26D 5/04* | (2006.01) | |
| *B26D 7/02* | (2006.01) | |
| *H01M 4/04* | (2006.01) | |
| *H01M 10/04* | (2006.01) | |
| *H01M 50/406* | (2021.01) | |

(52) U.S. Cl.

CPC ......... *H01M 4/04* (2013.01); *H01M 10/0404* (2013.01); *H01M 50/406* (2021.01)

(56) References Cited

U.S. PATENT DOCUMENTS

| | | |
|---|---|---|
| 2015/0033547 A1 | 2/2015 | Yang et al. |
| 2018/0331388 A1 | 11/2018 | Yang et al. |
| 2020/0385229 A1* | 12/2020 | Kim .......................... B26D 5/08 |

FOREIGN PATENT DOCUMENTS

| | | |
|---|---|---|
| CN | 209150237 U | 7/2019 |
| EP | 2648264 A2 | 10/2013 |
| EP | 3955364 A1 | 2/2022 |
| JP | H06206197 A | 7/1994 |
| JP | 2016055322 A | 4/2016 |
| KR | 0162747 B1 | 1/1999 |
| KR | 100414526 B1 | 1/2004 |
| KR | 20110002645 A | 1/2011 |
| KR | 101115299 B1 | 3/2012 |
| KR | 101254858 B1 | 4/2013 |
| KR | 101271492 B1 | 6/2013 |
| KR | 101637659 B1 | 7/2016 |
| KR | 101751008 B1 | 6/2017 |
| KR | 101963739 B1 | 3/2019 |
| KR | 20190091746 A | 8/2019 |
| KR | 20200039331 A | 4/2020 |
| KR | 20200131181 A | 11/2020 |

OTHER PUBLICATIONS

Extended European Search Report including Written Opinion for Application No. 22746235.5 dated May 22, 2024, pp. 1-8.
International Search Report for PCT/KR2022/001422 mailed May 12, 2022. 3 pgs.

* cited by examiner

【FIG. 1】
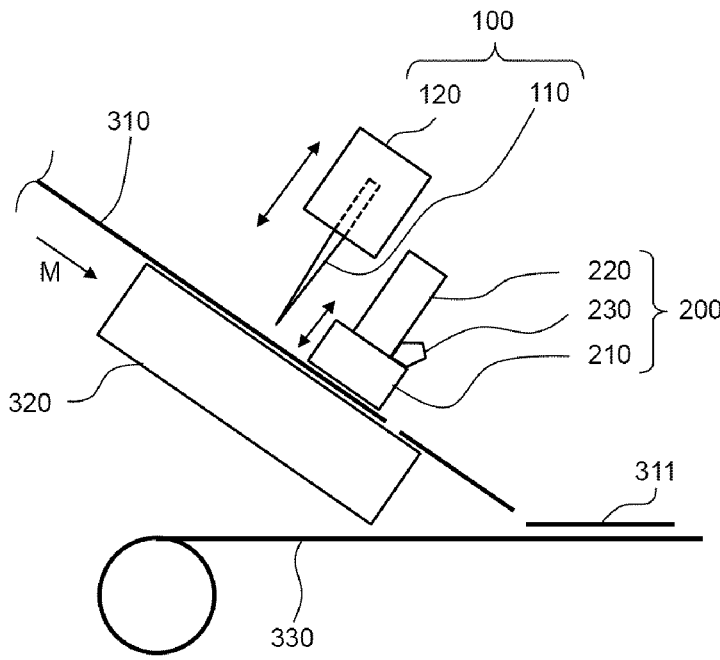
【FIG. 2】
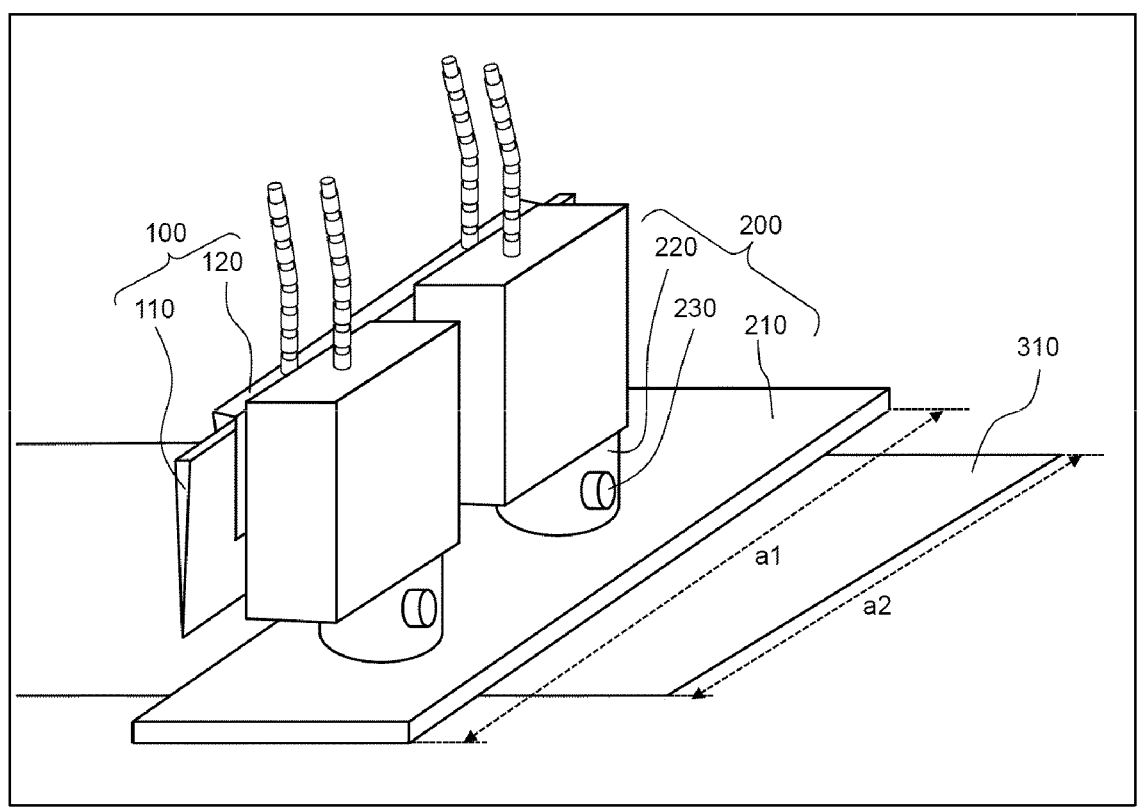

【FIG. 3】
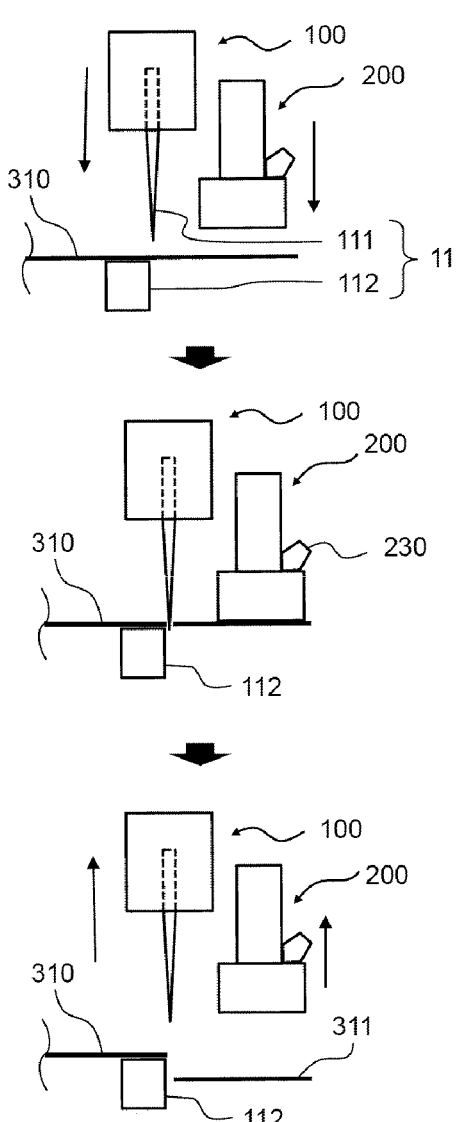
【FIG. 4】
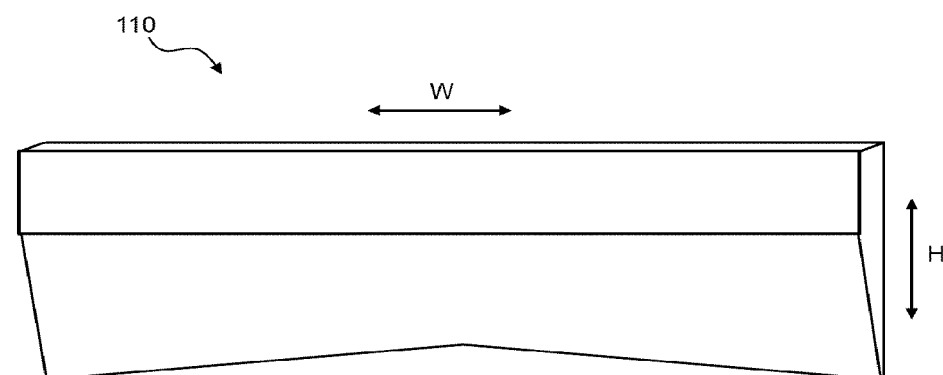

【FIG. 5】
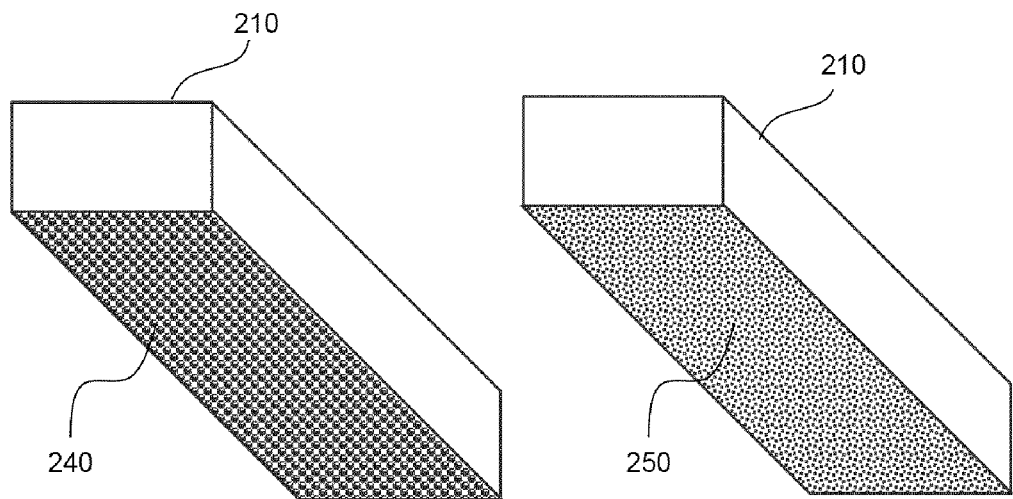
【FIG. 6】
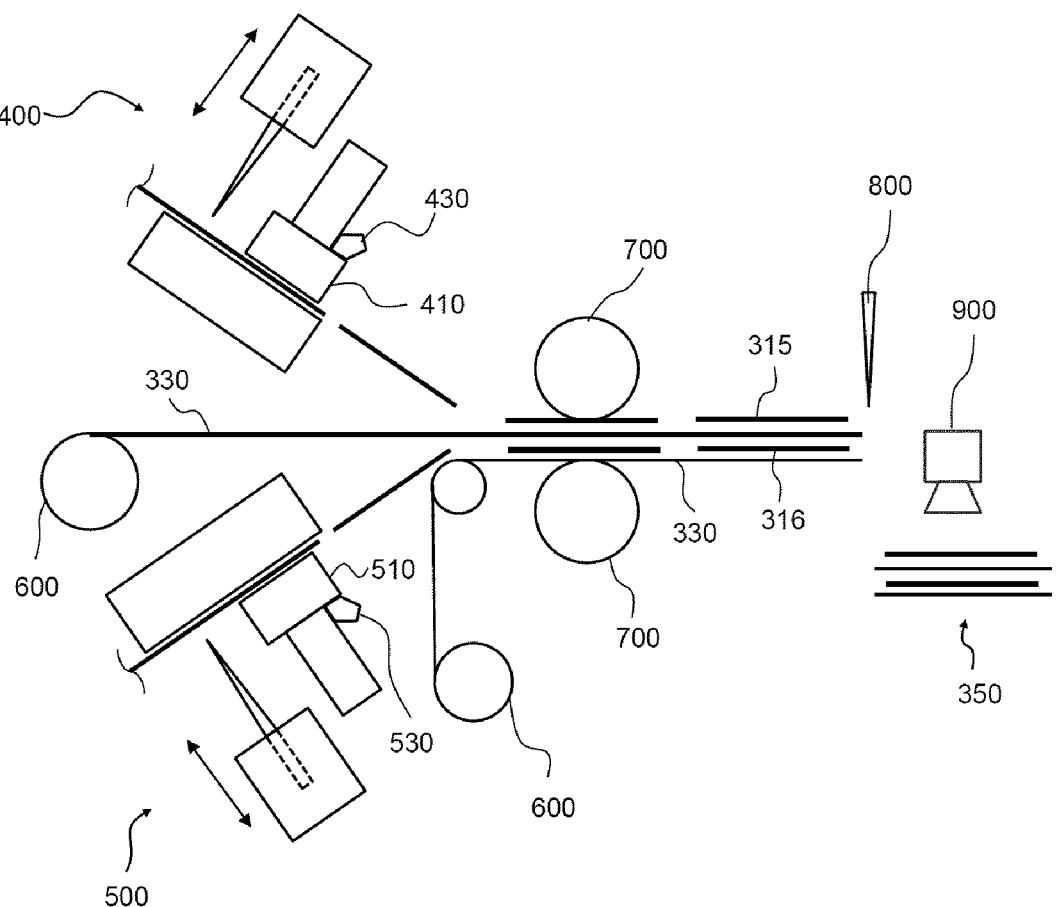

ELECTRODE CUTTING DEVICE AND ELECTRODE MANUFACTURING APPARATUS INCLUDING THE SAME

CROSS-REFERENCE TO RELATED APPLICATIONS

This application is a national stage entry under 35 U.S.C. § 371 of International Application No. PCT/KR2022/001422, filed on Jan. 27, 2022, which claims priority to Korean Patent Application No. 10-2021-0013007, filed on Jan. 29, 2021, the disclosures of which are hereby incorporated herein by reference in their entireties.

TECHNICAL FIELD

The present invention relates to an electrode cutting device and an electrode manufacturing apparatus including the same. More particularly, the present invention relates to an electrode cutting device capable of monitoring a gripper configured to fix an electrode sheet, thereby preventing poor electrode cutting, and an electrode manufacturing apparatus including the same.

BACKGROUND ART

With acceleration in capacity increase and energy density improvement of a lithium secondary battery, the lithium secondary battery has been used as an energy source for medium and large devices, such as a vehicle or a power storage system, as well as small devices, such as a portable electronic device.

The lithium secondary battery may be manufactured using a method of receiving an electrode assembly, configured to have a structure in which a positive electrode, a separator, and a negative electrode are sequentially stacked, in a battery case and hermetically sealing the battery case.

The electrode assembly includes a single-cell configured to have a structure in which a first electrode and a separator are stacked, a mono-cell configured to have a structure in which a first electrode, a separator, and a second electrode are stacked, and a bi-cell configured to have a structure in which a first electrode, a separator, a second electrode, a separator, and a third electrode are stacked.

Each of the electrodes constituting the electrode assembly is manufactured by applying an electrode mixture to one surface or opposite surfaces of a thin electrode sheet made of copper, aluminum, or nickel, drying the same, pressing the same, and cutting the electrode sheet into a unit electrode.

A positive electrode and a negative electrode, each of which is the unit electrode thus manufactured, are stacked and laminated in the state in which a separator is interposed therebetween, whereby a unit cell is manufactured.

If the positive electrode and the negative electrode are not cut so as to have uniform sizes in a process of cutting the electrode sheet into the unit electrode, peripheries of the positive electrode and the negative electrode stacked in the state in which the separator is interposed therebetween may not be parallel to each other.

In addition, if poor cutting occurs when a certain unit electrode is cut from the electrode sheet, continuous poor electrode cutting may occur. In this case, it is necessary for a worker to interrupt the electrode cutting process and to take a measure for correction of poor cutting.

Such poor cutting may occur when air leaks from a cylinder that drives a gripper configured to fix the electrode sheet, whereby pressing force of the gripper is reduced. Conventionally, a method of checking air leakage through worker's touch was used.

This method increases dead time during a battery manufacturing process, whereby yield is reduced.

In connection therewith, Patent Document 1 discloses an electrode cutting device configured to form an electrode tab, wherein the electrode cutting device includes a first cutting unit and a second cutting unit configured to move while crossing each other in order to cut a tab formation portion.

Patent Document 1 discloses that the first cutting unit disposed under the tab formation portion moves upwards, a stripper disposed above the tab formation portion moves downwards so as to come into tight contact with an upper surface of the tab formation portion, and the second cutting unit moves downwards, wherein the cutting units cross each other to form an electrode tab, but does not disclose technology for adjusting the force of the stripper that fixes the electrode tab.

Accordingly, there is a need for technology capable of easily checking the pressing force of a gripper configured to fix an electrode sheet when cutting the electrode sheet into a unit electrode, thereby preventing poor electrode cutting.

PRIOR ART DOCUMENT (Patent Document 1) Korean Registered Patent Publication No. 1751008 (2017.06.20)

DISCLOSURE

Technical Problem

The present invention has been made in view of the above problems, and it is an object of the present invention to provide an electrode cutting device capable of stably fixing an electrode sheet such that electrodes stacked in a lamination process are aligned with each other and an electrode manufacturing apparatus including the same.

Technical Solution

An electrode cutting device according to the present invention to accomplish the above object includes a cutting unit configured to cut an electrode sheet and a fixing unit configured to fix the electrode sheet, wherein the cutting unit includes a cutter configured to cut the electrode sheet by shearing and a cutter lifting portion configured to move the cutter so as to be perpendicular to a surface of the electrode sheet, and the fixing unit includes a gripper configured to press the electrode sheet so as to be fixed, a driving portion configured to drive the gripper so as to be moved, and a sensor configured to monitor the driving portion In the electrode cutting device according to the present invention, the cutter may be configured to have a double-edged structure in which the height of the cutter is gradually increased from the middle to opposite ends thereof in a lateral direction.

In the electrode cutting device according to the present invention, the cutter may include an upper cutter located above the electrode sheet and a lower cutter located under the electrode sheet, the lower cutter being configured to cut the electrode sheet while crossing the upper cutter moved downwards.

In the electrode cutting device according to the present invention, the driving portion may be driven by a cylinder.

In the electrode cutting device according to the present invention, the width of the gripper may be greater than the width of the electrode sheet.

In the electrode cutting device according to the present invention, a protrusion may be formed on a pressing surface of the gripper.

In the electrode cutting device according to the present invention, a rubber coating layer may be added to the pressing surface of the gripper.

In the electrode cutting device according to the present invention, the sensor may be a pneumatic gauge sensor, and the sensor may continuously or periodically monitor the pressure of the cylinder.

In the electrode cutting device according to the present invention, the sensor may be detachably attached to the driving portion.

In addition, the present invention provides an electrode manufacturing apparatus including the electrode cutting device. Specifically, the electrode manufacturing apparatus includes the electrode cutting device, a separator supply unit configured to supply a separator, on which a cut positive electrode and a cut negative electrode will be disposed, a lamination device configured to laminate the positive electrode and the negative electrode attached to the separator, a separator cutting unit configured to cut the separator of the laminated stack, and an inspection unit configured to inspect alignment of a unit cell, and the electrode cutting device includes a positive electrode cutting device and a negative electrode cutting device.

In the electrode manufacturing apparatus according to the present invention, when the alignment of the unit cell inspected by the inspection unit is not correct, the pressure of the driving portion may be checked using the sensor of the positive electrode cutting device and the sensor of the negative electrode cutting device.

In addition, the present invention may provide various combinations of the above solving means.

Advantageous Effects

As is apparent from the above description, an electrode cutting device according to the present invention includes a sensor capable of monitoring the pressure of a cylinder, which is a means that drives a gripper configured to fix an electrode sheet, and therefore it is possible to check whether air leaks from the cylinder without worker intervention.

In addition, it is possible to check the pressure of the cylinder in real time using the sensor, whereby it is possible to prevent continuous poor electrode cutting, and therefore it is possible to reduce a defect rate.

In addition, anti-slip treatment is performed on a lower surface of the gripper that is brought into contact with the electrode sheet, whereby it is possible to increase fixing force of the electrode sheet.

DESCRIPTION OF DRAWINGS

FIG. 1 is a side view of an electrode cutting device according to the present invention.

FIG. 2 is a perspective view of the electrode cutting device.

FIG. 3 is a side view sequentially showing a process of cutting an electrode using a cutter including an upper cutter and a lower cutter.

FIG. 4 is a perspective view of the cutter.

FIG. 5 is a perspective view of a gripper.

FIG. 6 is a schematic view of an electrode manufacturing apparatus.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 1 is a side view of an electrode cutting device according to the present invention, and FIG. 2 is a perspective view of the electrode cutting device.

Referring to FIGS. 1 and 2, an electrode sheet 310 is transferred to an upper surface of a support portion 320, and the electrode sheet 310 is fixed by a fixing unit 200, whereby transfer of the electrode sheet is stopped. In this state, the electrode sheet 310 is cut by a cutting unit 100, whereby an electrode 311 is discharged.

Electrodes 311 are disposed on a separator 330 so as to be spaced apart from each other.

The electrode cutting device according to the present invention includes a cutting unit 100 configured to cut an electrode sheet 310 and a fixing unit 200 configured to fix the electrode sheet 310.

The cutting unit 100 includes a cutter 110 configured to cut the electrode sheet 310 by shearing while being moved downwards so as to be perpendicular to the electrode sheet and a cutter lifting portion 120 configured to move the cutter 110 so as to be perpendicular to a surface of the electrode sheet 310.

The fixing unit 200 includes a gripper 210 configured to press the electrode sheet 310 so as to be fixed, a driving portion 220 configured to drive the gripper 210 so as to be moved, and a sensor 230 configured to monitor the driving portion 220.

The gripper 210 is moved upwards and downwards so as to be perpendicular to the electrode sheet 310. That is, when the gripper is moved downwards, the electrode sheet 310 is fixed onto the support portion 320, and when the gripper 210 is moved upwards, the fixed state of the electrode sheet 310 is released, and the electrode sheet 310 is transferred.

Alternatively, the gripper may be moved upwards and downwards, and at the same time or subsequently may be moved forwards and rearwards in a direction parallel to a transfer direction M of the electrode sheet.

The driving portion 220 is driven by a cylinder, and the gripper may be driven by increasing or decreasing the air pressure of the cylinder.

In addition, the cutter lifting portion 120 may be driven by increasing or decreasing the air pressure of the cylinder.

The sensor 230 may be a pneumatic gauge sensor, and the sensor 230 may continuously monitor the pressure of the cylinder. Alternatively, measurement time may be set such that the sensor 230 can periodically monitor the pressure of the cylinder.

In general, the cutting unit and the fixing unit are disposed so as to be adjacent to each other, or are integrally assembled with each other. Air may leak from the cylinder due to vibration generated from the cutting unit, whereby the air pressure of the cylinder may be reduced. In this case, the force of the fixing unit applied to the electrode sheet may be lower than a predetermined value, whereby the electrode sheet may not be stably fixed, and therefore the electrode sheet may move in the movement direction thereof.

If the cutting unit cuts the electrode sheet in this state, poor cutting, in which deviation occurs in length of the electrode sheet in the transfer direction M thereof, may occur. As a result, misalignment between electrodes may occur when the electrodes are stacked so as to be laminated.

In addition, poorly cut electrodes may be continuously manufactured as long as the electrode cutting device is not stopped, whereby yield may be reduced.

When such poor cutting occurs, therefore, it is important to rapidly detect the same and to take an appropriate measure.

In the present invention, therefore, the sensor 230 configured to measure the air pressure of the driving portion 220 may be attached to the driving portion 220, whereby it is possible to rapidly and accurately detect whether the air pressure of the driving portion is changed.

In the present invention, the width a1 of the gripper 210 may be greater than the width a2 of the electrode sheet in order to secure stability in fixing the electrode sheet 310.

The driving portion 220 is added to each of opposite ends of the gripper 210 in a lateral direction so as to evenly press the gripper.

In a concrete example, the sensor 230 may be detachably attached to the driving portion 220, and it is possible to check whether a large number of driving portions are defective using a single sensor.

FIG. 3 is a side view sequentially showing a process of cutting an electrode using the cutter, which includes an upper cutter and a lower cutter.

Referring to FIG. 3, a process of cutting the electrode sheet 310 using the electrode cutting device, which includes the cutting unit 100 and the fixing unit 200 including the sensor 230, is shown.

However, the cutter 110 shown in FIG. 3 includes an upper cutter 111 located above the electrode sheet 310 and a lower cutter 112 located under the electrode sheet 310, the lower cutter being configured to cut the electrode sheet 310 while crossing the upper cutter 111 moved downwards and to discharge an electrode 311.

It is preferable for the distance between the upper cutter 111 and the lower cutter 112 to be approximately 0. The left surface of the upper cutter 111 and the right surface of the lower cutter 112 are slid relative thereto, whereby the electrode sheet 310 is cut.

FIG. 4 is a perspective view of the cutter.

Referring to FIG. 4, the cutter 110, which is used as an upper cutter, is configured to have a double-edged structure in which the height H of the cutter is gradually increased from the middle to opposite ends thereof in a lateral direction W.

Unlike this, if the height of the cutter is uniform, cutting force is reduced, and it is difficult to achieve parallelism with the lower cutter as the width of the electrode sheet is increased. As shown in FIG. 4, therefore, the double-edged structure is used in order to increase cutting force.

FIG. 5 is a perspective view of the gripper.

Referring to FIG. 5, the gripper 210 performs a function of stably fixing the electrode sheet. In order to effectively perform this function, a protrusion 240 may be formed on a pressing surface of the gripper that is brought into tight contact with the electrode sheet. Alternatively, a rubber coating layer 250 may be formed on the pressing surface of the gripper.

FIG. 6 is a schematic view of an electrode manufacturing apparatus.

Referring to FIG. 6, the electrode manufacturing apparatus includes a positive electrode cutting device 400 configured to cut a positive electrode sheet in order to discharge a positive electrode, a negative electrode cutting device 500 configured to cut a negative electrode sheet in order to discharge a negative electrode, a separator supply unit 600 configured to supply a separator 330, on which the cut positive electrode 315 and the cut negative electrode 316 will be disposed, a lamination device 700 configured to laminate the positive electrode and the negative electrode attached to the separator, a separator cutting unit 800 configured to cut the separator of the laminated stack, and an inspection unit 900 configured to inspect alignment of a unit cell 350.

The positive electrode cutting device 400 and the negative electrode cutting device 500 include sensors 430 and 530 configured to monitor the pressure of grippers 410 and 510, respectively. When the positive electrode and the negative electrode of the unit cell 350 inspected by the inspection unit 900 are misaligned, the pressure of the driving portion may be checked using the sensor 430 of the positive electrode cutting device 400 and the sensor 530 of the negative electrode cutting device 500.

If the pressure of the driving portion deviates from a predetermined range, an electrode manufacturing process may be immediately interrupted in order to stop production of defective electrodes.

In the present invention, as described above, the sensor configured to monitor the pressure of the cylinder, which drives the gripper, is included such that the electrode sheet is cut in the state in which the electrode sheet is stably fixed, whereby it is possible to rapidly and accurately check whether defective electrodes are produced without worker intervention.

Those skilled in the art to which the present invention pertains will appreciate that various applications and modifications are possible within the category of the present invention based on the above description.

DESCRIPTION OF REFERENCE NUMERALS

100: Cutting unit
110: Cutter
111: Upper cutter
112: Lower cutter
120: Cutter lifting portion
200: Fixing unit
210, 410, 510: Grippers
220: Driving portion
230, 430, 530: Sensors
240: Protrusion
250: Rubber coating layer
310: Electrode sheet
311: Electrode
315: Positive electrode
316: Negative electrode
320: Support portion
330: Separator
350: Unit cell
400: Positive electrode cutting device
500: Negative electrode cutting device
600: Separator supply unit
700: Lamination device
800: Separator cutting unit
900: Inspection unit

INDUSTRIAL APPLICABILITY

As is apparent from the above description, an electrode cutting device according to the present invention includes a sensor capable of monitoring the pressure of a cylinder, which is a means that drives a gripper configured to fix an electrode sheet, and therefore it is possible to check whether air leaks from the cylinder without worker intervention.

In addition, it is possible to check the pressure of the cylinder in real time using the sensor, whereby it is possible to prevent continuous poor electrode cutting, and therefore it is possible to reduce a defect rate.

In addition, anti-slip treatment is performed on a lower surface of the gripper that is brought into contact with the electrode sheet, whereby it is possible to increase fixing force of the electrode sheet.

The invention claimed is:

1. An electrode cutting device comprising:
a cutting unit configured to cut an electrode sheet, the cutting unit including a cutter configured to cut the electrode sheet by shearing, the cutter configured to move towards and away from a surface of the electrode sheet;
a support portion configured to support the electrode sheet; and a fixing unit configured to removably fix the electrode sheet to the support portion, the fixing unit including a gripper configured to press the electrode sheet against the support portion, a driving portion configured to move the gripper, and a sensor,
wherein the driving portion is a pneumatic cylinder configured to move the gripper towards the support portion to press the electrode sheet against the support portion, and
wherein the sensor is a pneumatic gauge sensor configured to continuously or periodically monitor a pressure of the pneumatic cylinder.

2. The electrode cutting device according to claim 1, wherein the cutter has a double-edged structure in which a height of the cutter is gradually increased from a middle to opposite ends thereof in a lateral direction.

3. The electrode cutting device according to claim 1, wherein the cutter comprises:
an upper cutter configured to be located above the electrode sheet; and
a lower cutter configured to be located under the electrode sheet, the upper cutter and the lower cutter together being configured to cut the electrode sheet.

4. The electrode cutting device according to claim 1, wherein the gripper is configured such that a width of the gripper is greater than a width of the electrode sheet.

5. The electrode cutting device according to claim 1, wherein the gripper has a protrusion extending from a pressing surface thereof.

6. The electrode cutting device according to claim 1, wherein the gripper has a rubber coating layer overlying a pressing surface thereof.

7. The electrode cutting device according to claim 1, wherein the sensor is detachably coupled to the driving portion.

8. An electrode manufacturing apparatus comprising the electrode cutting device according to claim 1.

9. The electrode manufacturing apparatus according to claim 8, wherein the electrode manufacturing apparatus comprises:
the electrode cutting device, which is configured to cut a positive electrode and a negative electrode;
a lamination device configured to laminate the positive electrode and the negative electrode to a separator to produce a laminated stack; and
an inspection unit configured to inspect alignment of a unit cell portion of the laminated stack.

10. The electrode manufacturing apparatus according to claim 9, wherein the apparatus is configured such that when the alignment of the unit cell inspected by the inspection unit is not correct, a pressure of the driving portion is checked using the sensor.

* * * * *